(12) United States Patent
Cardi

(10) Patent No.: US 11,837,804 B2
(45) Date of Patent: Dec. 5, 2023

(54) PROTECTIVE COVER FOR A POWER CORD

(71) Applicant: Marie L. Cardi, Westlake, OH (US)

(72) Inventor: Marie L. Cardi, Westlake, OH (US)

( * ) Notice: Subject to any disclaimer, the term of this patent is extended or adjusted under 35 U.S.C. 154(b) by 136 days.

(21) Appl. No.: 17/301,186

(22) Filed: Mar. 29, 2021

(65) Prior Publication Data

US 2022/0311170 A1 Sep. 29, 2022

(51) Int. Cl.
*H01R 13/516* (2006.01)
*H02G 3/04* (2006.01)
*H01B 7/24* (2006.01)

(52) U.S. Cl.
CPC ............ *H01R 13/516* (2013.01); *H01B 7/24* (2013.01); *H02G 3/0462* (2013.01)

(58) Field of Classification Search
CPC .............. H01R 13/5213; H01R 13/52; H01R 13/5202; H01R 13/5219; H01R 13/44; H01R 13/6397; H01R 25/003
See application file for complete search history.

(56) References Cited

U.S. PATENT DOCUMENTS

| | | | |
|---|---|---|---|
| 4,281,211 A | 7/1981 | Tatum et al. | |
| 4,698,459 A * | 10/1987 | Drake | H01R 11/284 439/522 |
| 5,052,939 A * | 10/1991 | Koch | H01R 13/6397 439/304 |
| 5,368,500 A * | 11/1994 | Dedering | H01R 13/6392 439/367 |
| 5,564,944 A * | 10/1996 | Fukuda | H01R 13/506 439/456 |
| 5,722,854 A * | 3/1998 | Geisler | H01R 13/443 439/528 |
| 6,250,946 B1 * | 6/2001 | Tardy | H01R 13/6397 439/367 |
| 6,289,896 B1 * | 9/2001 | Hart | A61B 46/10 383/41 |
| 6,960,727 B2 | 11/2005 | Hering | |

(Continued)

OTHER PUBLICATIONS

Watch Your Mouth Award-winning USB charger safety cover (n.d.). Retreived May 13, 2021, from https://geddysmom.com/product/watch-your-mouth/.

(Continued)

*Primary Examiner* — Truc T Nguyen
(74) *Attorney, Agent, or Firm* — Dunlap Bennett & Ludwig, PLLC

(57) ABSTRACT

A protective cover for the connector of a power cord is provided. The protective cover has a body that defines an enclosure for protectively housing the connector and any associated built-up portion, as well as the portion of the power cord that interfaces with the connector and/or built-up portion. The protective cover may have a filament extending therefrom to a cord ring that attaches to the power cord itself to act as a lanyard toggle. The protective cover may move between an open position and a closed position for receiving and protecting, respectively, the connector. The protective cover may also have elastic properties enabling it to elastically deform sufficiently to slide onto the connector, wherein a tapered hood of the protective cover shrouds the portion of the power cord that interfaces with the connector and/or built-up portion.

12 Claims, 5 Drawing Sheets

(56) References Cited

U.S. PATENT DOCUMENTS

| | | | |
|---|---|---|---|
| 7,052,305 B2 | 5/2006 | Kurokawa | |
| 7,285,725 B1* | 10/2007 | Saman | H01R 13/6392 |
| | | | 174/92 |
| 7,288,000 B2 | 10/2007 | Liu et al. | |
| 7,914,306 B1* | 3/2011 | Blackwell | H01R 13/5213 |
| | | | 439/588 |
| 7,944,364 B1 | 5/2011 | Bodkin, Sr. | |
| 9,331,466 B2 | 5/2016 | Scherpenberg et al. | |
| 9,337,676 B2 | 5/2016 | Benigno | |
| 9,407,032 B1* | 8/2016 | Song | H01R 13/5205 |
| 9,472,930 B2 | 10/2016 | Lake-Maiorana | |
| 9,766,657 B2 | 9/2017 | Moore | |
| 10,283,897 B1* | 5/2019 | Lo | H01R 13/025 |
| 10,361,507 B2 | 7/2019 | Zaytoun, Jr. | |
| 10,665,986 B1 | 5/2020 | Prado | |
| 2004/0097120 A1* | 5/2004 | Limber | H01R 13/6392 |
| | | | 439/369 |
| 2006/0035508 A1* | 2/2006 | Stekelenburg | H01R 13/6392 |
| | | | 439/369 |
| 2011/0065313 A1 | 3/2011 | Huang | |
| 2012/0214335 A1* | 8/2012 | Natoli | H01R 13/5213 |
| | | | 439/519 |
| 2014/0110150 A1 | 4/2014 | Huang | |
| 2015/0340122 A1 | 11/2015 | Keestra et al. | |
| 2016/0002463 A1 | 1/2016 | Keestra et al. | |
| 2016/0329132 A1* | 11/2016 | Nooner | H02G 3/088 |
| 2017/0018871 A1* | 1/2017 | Vaccaro | H01R 13/5205 |
| 2017/0062972 A1* | 3/2017 | Zhang | H01R 13/5205 |
| 2020/0028297 A1* | 1/2020 | Sheets | H01R 13/6593 |
| 2020/0358220 A1* | 11/2020 | Meyer | H01R 13/58 |

OTHER PUBLICATIONS

Cartoon Animals USB Cable protector. Mavigadget. (n.d.). Retrieved Sep. 20, 2022, from https://mavigadget.com/products/cartoon-animals-usb-cable-protector/.

Cartoon Animals USB Cable protector. Mavigadget. (n.d.). Retrieved Sep. 14, 2022, from https://mavigadget.com/products/cartoon-animals-usb-cable-protector/, Wayback Machine page located under date Oct. 29, 2020.

* cited by examiner

PROTECTIVE COVER FOR A POWER CORD

BACKGROUND OF THE INVENTION

The present invention relates to accessories for electronic devices and, more particularly, a protective cover for the connector of a power cord for an electronic device, such as a Microsoft® surface laptop.

The "connector" of a power cord is inserted in the receptable of an electronic device, while the other side of the power cord is called the "receptacle", which is plugged into the wall socket. The connector tends to be the portion of the power cord that fails the most frequently; the connector breaks easily and also can short out if exposed to liquids. When the connector breaks, cracks, or shorts out the entire power needs to be replaced, thus incurring more costs. For instance, the power cord for Microsoft® surface laptop is very vulnerable and has an open connector that has exposed wires that electrically connect to the laptop port. The exposed wires make this connector particularly susceptible to damage. Furthermore, the exposure of these electrical connections can be dangerous to pets or small children playing with them.

As can be seen, there is a need for a protective cover for the connector of a power cord for the electronic devices, wherein the protective cover completely protects the connector, preventing damage thereto.

The protective cover embodied in the present invention protects the connector when not in use, keeping it intact so that it does not need to be replaced due to breakage or other forms of failure-inducing damage.

SUMMARY OF THE INVENTION

In one aspect of the present invention, a device for protecting a connector of a power cord, the device includes the following: a body defining an enclosure dimensioned to house the connector, wherein the enclosure includes a sleeve for receiving a portion of the power cord, wherein said portion interfaces with the connector; further including: a filament extending from the body to a cord ring; and a closed opening of the cord ring providing sufficient elastic deformability to receive the connector in an urged condition though not in an un-urged condition; and a built-up portion integrated with the connector, wherein the enclosure houses the built-up portion, wherein the sleeve defines a portion of the enclosure having a cross sectional area one third or less than that of a cross section of a remaining portion of the enclosure.

In another aspect of the present invention, the device for protecting a connector of a power cord includes the following: the body having a first portion and a second portion; a pivotable point interconnecting the first and second portions in such a way that the first and second portions move relative to each other between a closed condition and an open condition providing access to the enclosure; a filament extending from the body to a cord ring; and a closed opening of the cord ring providing sufficient elastic deformability receive the connector in an urged condition though not in an un-urged condition; a built-up portion integrated with the connector, wherein the enclosure houses the built-up portion, wherein said portion interfaces with the connector, wherein the sleeve defines a portion of the enclosure having a cross sectional area one third or less than that of a cross section of a remaining portion of the enclosure.

In yet another aspect of the present invention, the device for protecting a connector of a power cord includes the following: the body having elastic properties so as to slide over the connector, wherein the sleeve is a tapered hood tapering downward from the body to said portion of the power cord wherein said portion interfaces with the connector; a built-up portion integrated with the connector, wherein the enclosure houses the built-up portion, wherein said portion interfaces with the connector, and wherein the sleeve defines a portion of the enclosure having a cross sectional area one third or less than that of a cross section of a remaining portion of the enclosure.

These and other features, aspects and advantages of the present invention will become better understood with reference to the following drawings, description and claims.

DETAILED DESCRIPTION OF THE INVENTION

Figure 1:
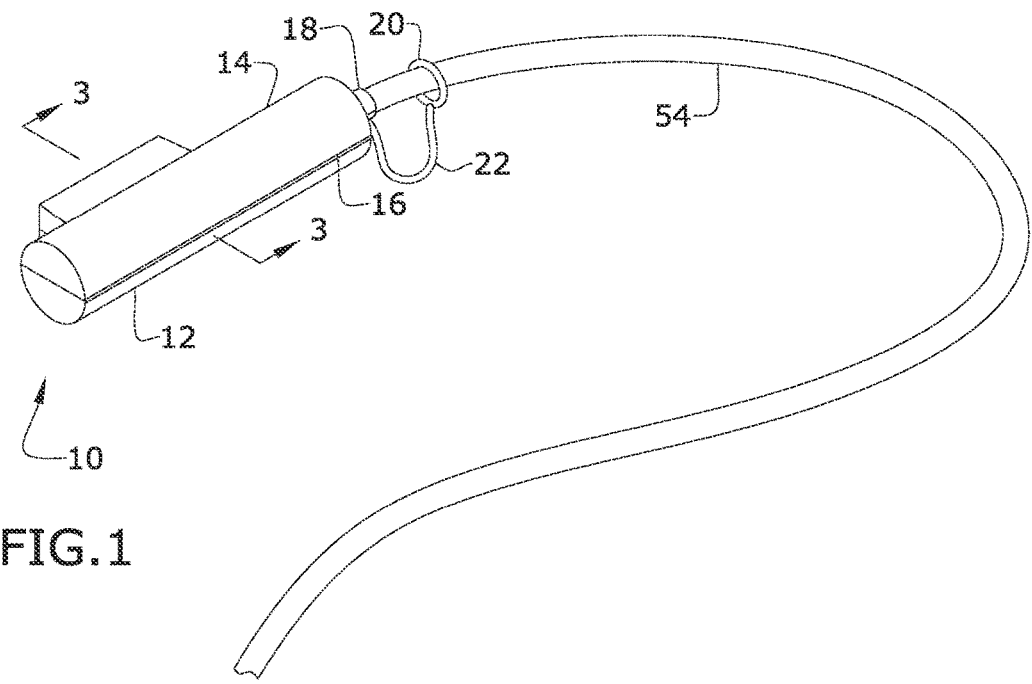
FIG. 1 is a perspective view of an exemplary embodiment of the present invention, shown in use.
Figure 2:
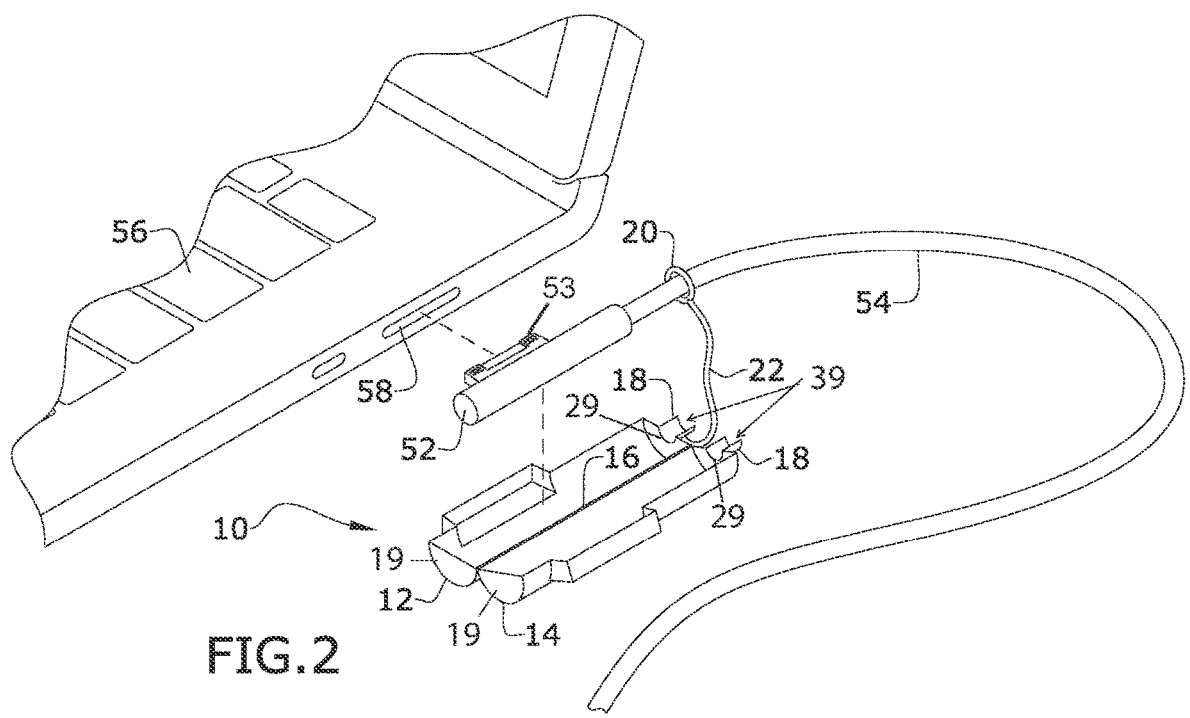
FIG. 2 is an exploded perspective view of an exemplary embodiment of the present invention, illustrating the closed ends 19 and the open ends 29 of each of the two half cylindrical portions, respectively, as well as illustrating the respective portions of the internal space defined by each of the two half tubular portions/cord sleeves 18.
Figure 3:
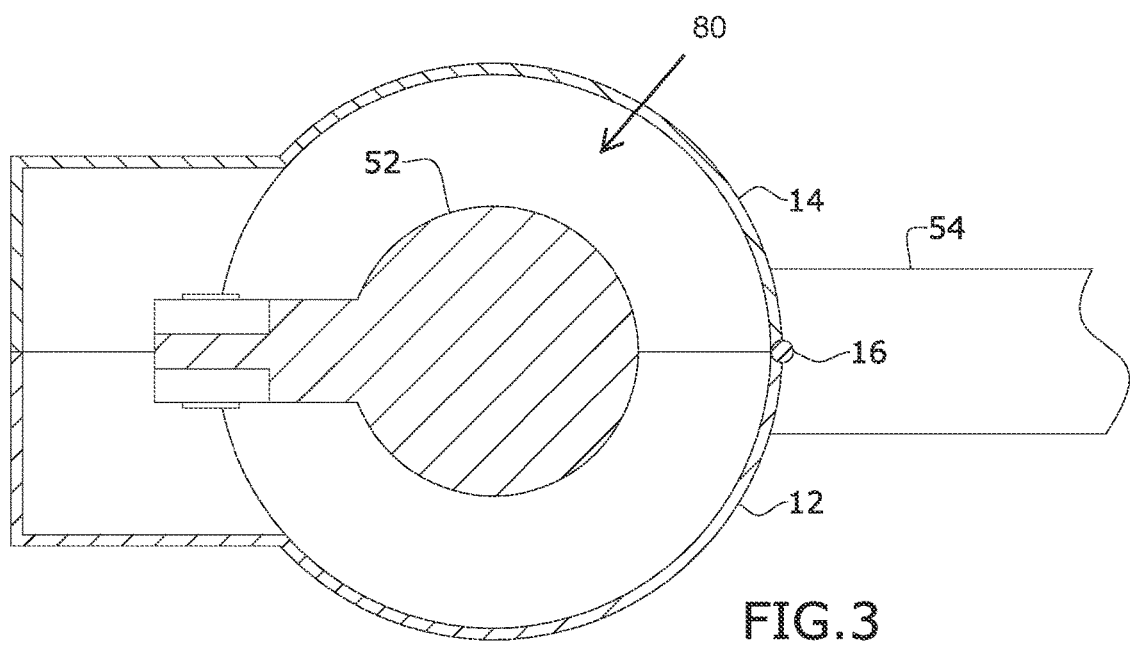
FIG. 3 is a section view of an exemplary embodiment of the present invention, taken along line 3-3 in FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a protective cover for the connector of a power cord. The protective cover has a body that defines an enclosure for protectively housing the connector and any associated built-up portion, as well as the portion of the power cord that interfaces with the connector and/or built-up portion. The protective cover may have a filament extending therefrom to a cord ring that attaches to the power cord itself to act as a lanyard toggle. The protective cover may move between an open position and a closed position for receiving and protecting, respectively, the connector. The protective cover may also have elastic properties enabling it to elastically deform sufficiently to slide onto the connector, wherein a tapered hood of the protective cover shrouds the portion of the power cord that interfaces with the connector and/or built-up portion.

It should be understood by those skilled in the art that the use of directional terms such as upper, upward, lower, bottom, and the like are used in relation to the illustrative embodiments as they are depicted in the figures, the upper (or upward) direction being toward the top margins of the corresponding figures, the lower (or bottom) direction being toward the bottom of the corresponding figures.

Referring now to FIGS. 1 through 11, the present invention may include a protective cover 10 for a connector 53 of a power cord 54. The connector 53 is the portion of the power cord 54 that is inserted into and/or electrically couples to a power port 58 of an electronic device 56. Typically, the connector 53 has a built-up portion 52 for securely handling the operation of connecting and disconnecting the connector 53.

The protective cover 10 may have a body defining an enclosure 80 dimensioned and adapted to circumscribe and thus protect the connector 53 and, possibly, its associated built-up portion 52. The protective cover 10 may provide a cord sleeve 18, 34, or 46 dimensioned and adapted to circumscribe and protect the portion of the power cord 54 that interfaces with the built-up portion 52/connector 53.

The body may include a lower portion 12, 28, or 40 and an upper portion 14, 30, or 42 joined a pivotal attachment point 16, 32, or 44, respectively. The pivotal attachment point 16, 32, or 44 may be a hinge or the like, whereby the pivotal attachment point 16, 32, or 44 enables the lower and upper portions 12, 28, or 40 and 14, 30, or 42 to move relative to each other between an closed position (FIG. 1) and an open position (FIG. 2) providing access to the enclosure 80. It being understood that the pivotal attachment point 16, 32, or 44 may not be present as long as the closed and open positions can be effectuated.

The dimensions of the lower and upper portions 12, 28, or 40 and 14, 30, or 42 may be cylindrical or have a shape that accommodates and conforms to the connector 53 and associated built-up portion 52 there enclose.

A filament 22, 38, or 50 may extend from the cord sleeve 18, 34, or 50 to a cord ring 20, 36, or 48, wherein the cord ring 20, 36, or 48 is dimensioned and adapted to encircle a periphery of the power cord 54, whereby the protective cover 10 will be interconnected to the power cord 54. The cord sleeve 18, 34, or 46 may be cylindrical and extend from a proximal face of the enclosure. The cord ring 20, 36, or 48 may be made from elastic material so that its opening can stretch or elastically deform around the connector 53 and associated built-up portion 52, wherein the opening of the cord ring 20, 36, or 48 deforms back to a periphery that cannot slide past the connector 53 and associated built-up portion 52, unless urged by a user.

In certain embodiments, the lower and upper portions 12, 28, or 40 and 14, 30, or 42 may not be separable. Rather the enclosure may be defined by a slip-over sleeve 24 made of stretchable material. The slip-over sleeve 24 may includes a tapered hood 26 that tapers to its smaller distal periphery from a larger periphery of the slip-over sleeve 24 to enclose the portion of the power cord 54 that interfaces with the built-up portion 52/connector 53 (in lieu of a cord sleeve).

Figure 4:
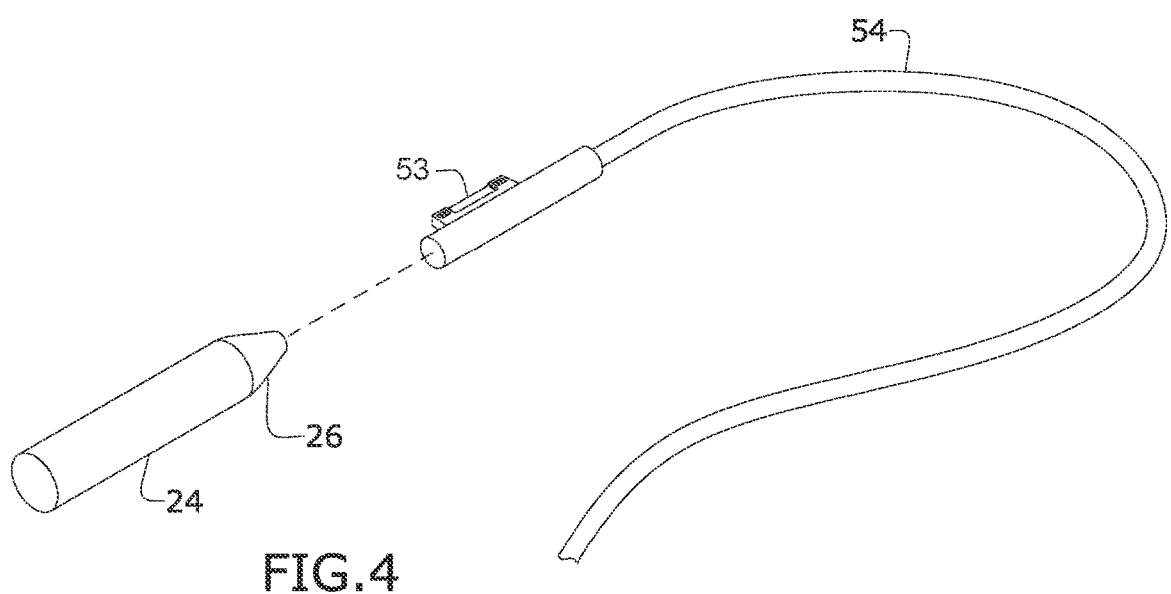
FIG. 4 is an exploded perspective view of an exemplary embodiment of the present invention.
Figure 5:
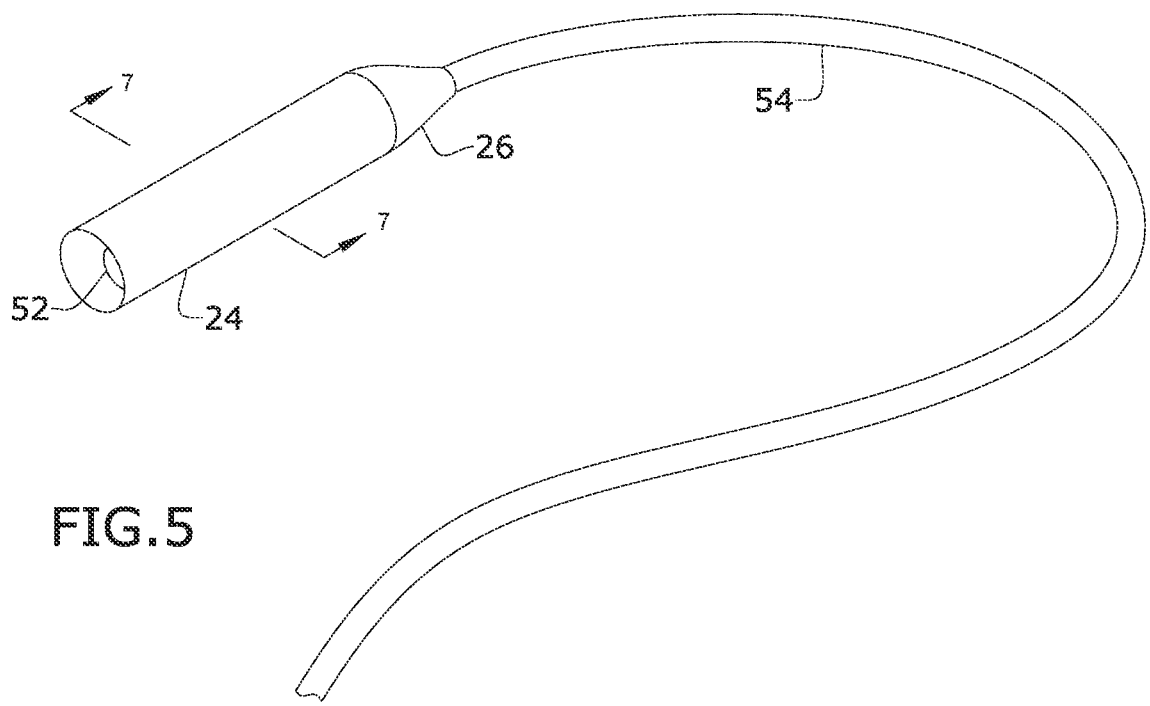
FIG. 5 is a perspective view of an exemplary embodiment of the present invention, shown in use.
Figure 6:
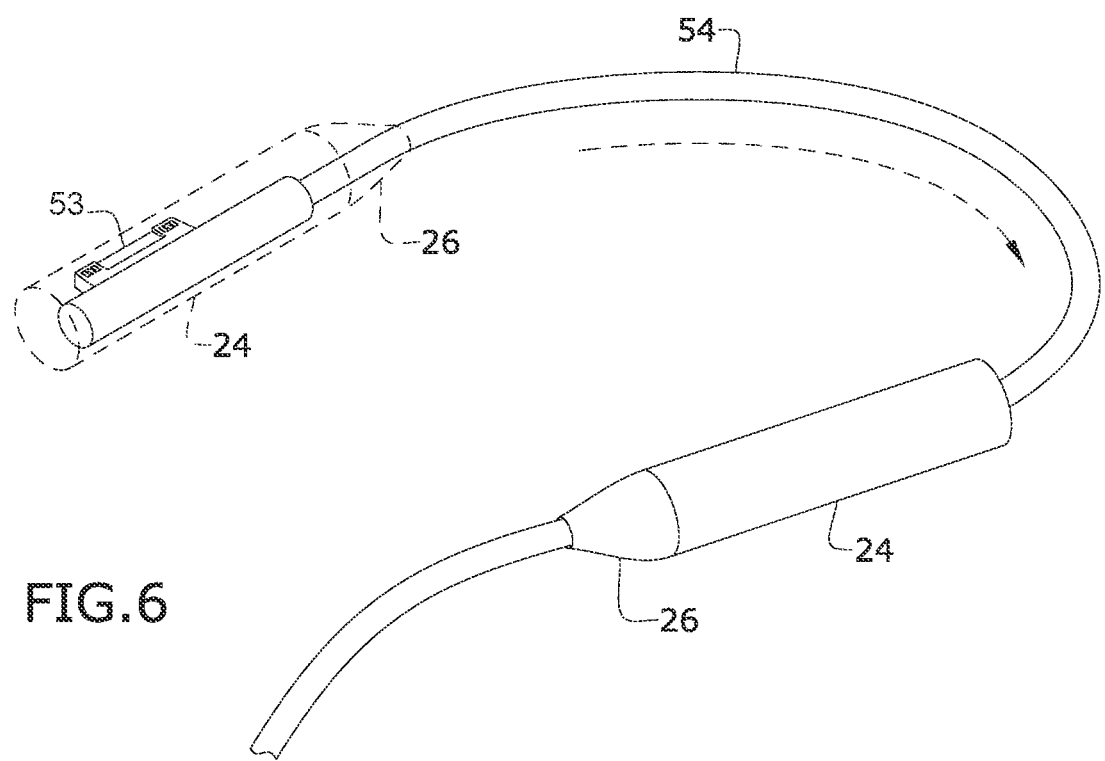
FIG. 6 is a perspective view of an exemplary embodiment of the present invention, illustrating installation.
Figure 7:
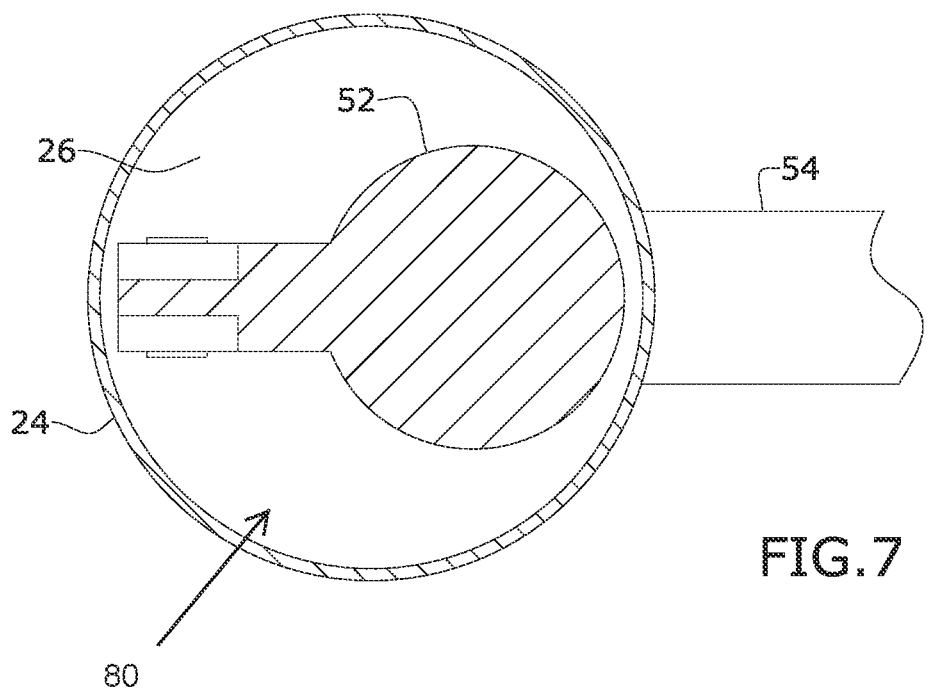
FIG. 7 is a section view of an exemplary embodiment of the present invention, taken along line 7-7 in FIG. 5.
Figure 8:
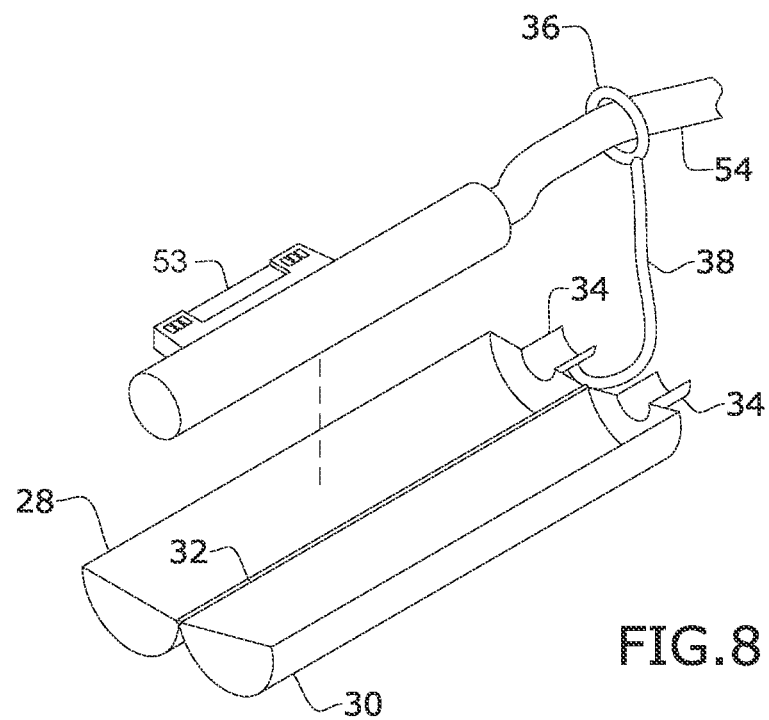
FIG. 8 is an exploded perspective view of an exemplary embodiment of the present invention.
Figure 9:
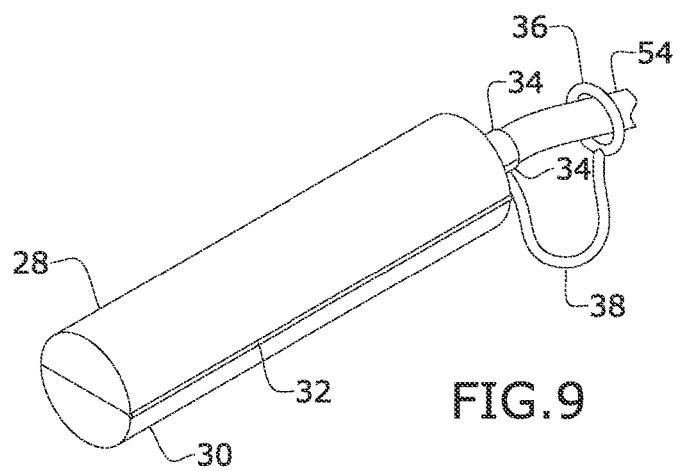
FIG. 9 is a perspective view of an exemplary embodiment of the present invention, shown in use.
Figure 10:
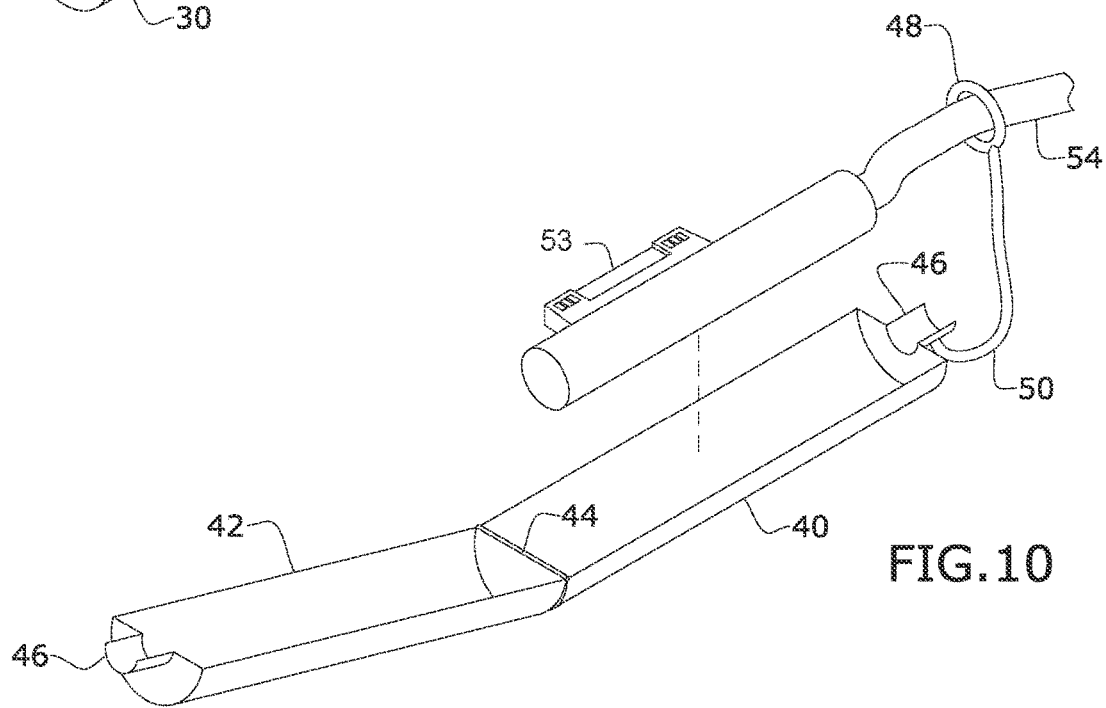
FIG. 10 is an exploded perspective view of an exemplary embodiment of the present invention.
Figure 11:
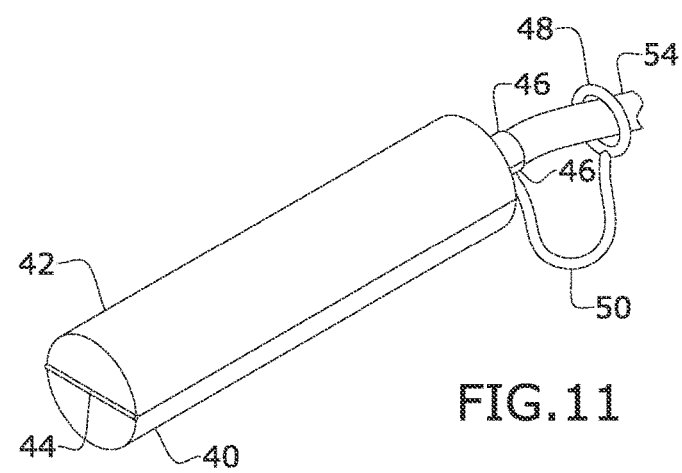
FIG. 11 is a perspective view of an exemplary embodiment of the present invention, shown in use.

The slip-over sleeve 24 and/or tapered hood 26 may made from elastic, deformable material, whereby the slip-over sleeve 24 can cover the connector 53 in one of two ways. First, the slip-over sleeve 24 can be pulled down from the receptacle-end of the power cord 54, wherein the smaller (distal) opening of the tapered end of the tapered hood 26 catches on the built-up portion 52/connector 53 (at the said portion of the power cord 55). Alternatively, the elastic/stretchable collar or tapered hood 26 enables a user to stretch or elastically deform said distal opening of the tapered hood 26 sufficiently to slide the tapered hood 26 and the slip-over sleeve 24 from the connector 53 end of the power cord 54 to cover the built-up portion 52/connector 53 and said portion of the power cord 54, as illustrated in FIG. 4. While in this engaged position, as illustrated in FIGS. 5-7, the elastic slip-over sleeve 24 could be furled or rolled up to the tapered hood 26 to allow the connector 53 to plug into the power port 58, and then when after removing the connector 53 from the electronic device 56, the slip-over sleeve 24 can be unfurled or unrolled to cover and protect the connector 53.

The protective cover 10 may completely encloses and fits to the surface of the connector 53 and associated built-up portion 54. The protective cover 10 may be made of durable material (including, but not limited to, various plasticized materials) that is water resistant and can be structured to resist crushing or cracking. The protective cover 10 may hang with a toggle or the lanyard ring/filament 20/22, 36/38, or 48/50 when not in use so that it is easily moved onto the end to cover and protect when use is desired.

The protective cover 10 can be made with a 3D printer, additive manufacturer or injections molding.

A method of using the present invention may include the following. The protective cover 10 disclosed above may be provided. A user may, for the embodiments having the movable lower and upper portions, move the body to the open position, place the connector 53 and a portion of the power cord 54 that interfaces with the built-up portion 52/connector 53 therein, and then move the enclosure 80 to the closed position. The cord ring may be attached to an upstream portion of the power cord 54. For the embodiment with the slip-over sleeve 24, the elastic/stretchable tapered hood 26 enables a user to stretch the distal opening of the tapered hood 26 sufficiently to slide slip-over sleeve 24 over the built-up portion 52/connector 53 and said portion of the power cord 54.

It should be understood, of course, that the foregoing relates to exemplary embodiments of the invention and that modifications may be made without departing from the spirit and scope of the invention as set forth in the following claims.

What is claimed is:

1. A device for protecting a connector of a power cord so that an electrical component thereof is not accessible to children, the device comprising:
   an enclosure having two half cylindrical portions hinged together to be movable, relative to each other, between an open condition and a closed condition defining a space dimensioned to house the connector;
   each half cylindrical portion comprises an open end and a closed end, so that in the closed condition only the open end provides access to the space; and
   a filament extending from the enclosure to a cord ring; and
   a closed opening of the cord ring providing sufficient elastic deformability to receive the connector in an urged condition though not in an un-urged condition.

2. The device of claim 1, wherein each open end is defined by a half tubular portion so that in the closed condition the two half tubular portions define an internal space dimensioned to enclose over the power cord.

3. The device of claim 1, further comprising a built-up portion integrated with the connector, wherein the enclosure in the closed condition houses the built-up portion.

4. The device of claim 2, wherein the internal space has a cross sectional area one third or less than that of a cross section of the enclosure.

5. The device of claim 1, wherein each half cylindrical portion has a rectangular prism portion so that with the enclosure in the closed condition the two rectangular prism portions define an electric connection space portion of said space.

6. The device of claim 5, wherein each rectangular prism portion radially projects from its respective half cylindrical portion.

7. The device of claim 6, wherein the electric connection space is dimensioned to house the electric component.

8. The device of claim 7, wherein the enclosure is cylindrical but for the two rectangular prism portions.

9. The device of claim 8, wherein the two rectangular prism portions are offset from the closed ends.

10. The device of claim 9, wherein each open end is defined by a half tubular portion so that in the closed condition the two half tubular portions define an internal space dimensioned to enclose over the power cord.

11. The device of claim 10, further comprising:
   a filament extending from the enclosure to a cord ring; and
   a closed opening of the cord ring providing sufficient elastic deformability to receive the connector in an urged condition though not in an un-urged condition.

12. The device of claim 11, wherein the internal space has a cross sectional area one third or less than that of a cross section of the enclosure.

\* \* \* \* \*